(12) United States Patent
Nakamachi et al.

(10) Patent No.: US 8,922,332 B2
(45) Date of Patent: Dec. 30, 2014

(54) ELECTRONIC EQUIPMENT, AND RESTRICTION REMOVAL METHOD

(75) Inventors: Keiichi Nakamachi, Yamatokoriyama (JP); Katsuhiko Ono, Yamatokoriyama (JP); Akira Kimura, Yamatokoriyama (JP); Norio Sato, Yamatokoriyama (JP); Kimiyuki Nishimura, Yamatokoriyama (JP); Hideki Takedomi, Yamatokoriyama (JP); Kingo Maeda, Yamatokoriyama (JP)

(73) Assignee: DMG Mori Seiki Co., Ltd., Yamatokoriyama-shi (JP)

( * ) Notice: Subject to any disclaimer, the term of this patent is extended or adjusted under 35 U.S.C. 154(b) by 749 days.

(21) Appl. No.: 13/098,704

(22) Filed: May 2, 2011

(65) Prior Publication Data

US 2011/0285499 A1 Nov. 24, 2011

(30) Foreign Application Priority Data

May 18, 2010 (JP) ................................. 2010-114343

(51) Int. Cl.
*G05B 23/00* (2006.01)
*G05B 19/418* (2006.01)

(52) U.S. Cl.
CPC ................................ *G05B 19/4188* (2013.01)
USPC ........................................ 340/3.32; 701/213

(58) Field of Classification Search
CPC ........................... G05B 23/00; G05B 19/4188
USPC ........................................ 340/3.32; 701/213
See application file for complete search history.

(56) References Cited

U.S. PATENT DOCUMENTS

| 7,162,347 B2 * | 1/2007 | Shibamori et al. | .............. 701/50 |
| 7,765,064 B2 * | 7/2010 | Yule | ............... 701/469 |
| 8,741,403 B2 * | 6/2014 | Chen et al. | ................ 428/34.1 |

FOREIGN PATENT DOCUMENTS

| CN | 1296237 C | 1/2007 |
| JP | 2008-129706 | 6/2008 |
| JP | 2009-205317 | 9/2009 |
| JP | 2009-251694 | 10/2009 |
| JP | 2010-3210 | 1/2010 |

OTHER PUBLICATIONS

Kobayashi Toru, System for Restoring Function of Numerical Control Device Having Machine Relocation-Preventing Function, Jan. 2010, JP2010003210 (English Translation).*
Watanabe Toru, Numerical Controller Having Function of Releasing Automatic Operation Prohibited State, Oct. 2009, JP2009251694 (English Translation).*
Otani Tadashi, Transfer Restricted Equipment and Its Illegal Transfer Prevention Method, Feb. 2005, JP2005044162 (English Translation).*

* cited by examiner

*Primary Examiner* — Brian Zimmerman
*Assistant Examiner* — Bhavin M Patel
(74) *Attorney, Agent, or Firm* — Oblon, Spivak, McClelland, Maier & Neustadt, L.L.P.

(57) ABSTRACT

Electronic equipment, including a GPS dongle and a PC, compares an acquired current location position of the electronic equipment with an acquired planned installation position of a machine tool to determine whether or not the current location position is within a predetermined range from the planned installation position. Further, the electronic equipment determines, if it is determined that the current location position is within the predetermined range from the planned installation position, whether or not a predetermined condition has been satisfied. The electronic equipment also performs, if it is determined that the predetermined condition has been satisfied, information input processing on the machine tool to remove activation restriction on the machine tool. In this manner, the electronic equipment can prevent illegal removal of activation restriction on the machine tool.

17 Claims, 12 Drawing Sheets

FIG.5

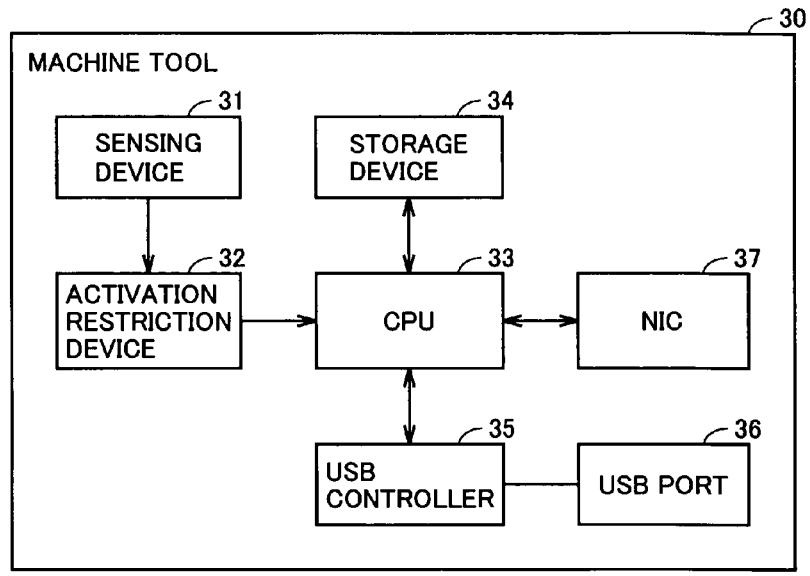

FIG.6

| IDENTIFICATION INFORMATION M90 | MACHINE NUMBER M91 OF MACHINE TOOL 30 |
| --- | --- |
| | NUMBER M92 OF SUBSTRATE HAVING CPU 33 MOUNTED THEREON |
| | MAC ADDRESS M93 |

FIG.7

| MACHINE INSTALLATION INFORMATION M1 | INSTALLATION INFORMATION M10 | PLANNED INSTALLATION POSITION INFORMATION M11 ON MACHINE TOOL (LATITUDE AND LONGITUDE INFORMATION) |
| --- | --- | --- |
| | | POSITIONAL TOLERANCE INFORMATION M12 |
| | | PLANNED DATE INFORMATION M13 ON REMOVAL OPERATION |
| | | OPERATION TIMER INFORMATION M14 |
| | IDENTIFICATION INFORMATION M20 | MACHINE NUMBER M21 OF MACHINE TOOL |
| | | NUMBER M22 OF SUBSTRATE HAVING CPU MOUNTED THEREON |
| | | MAC ADDRESS M23 |

FIG.13

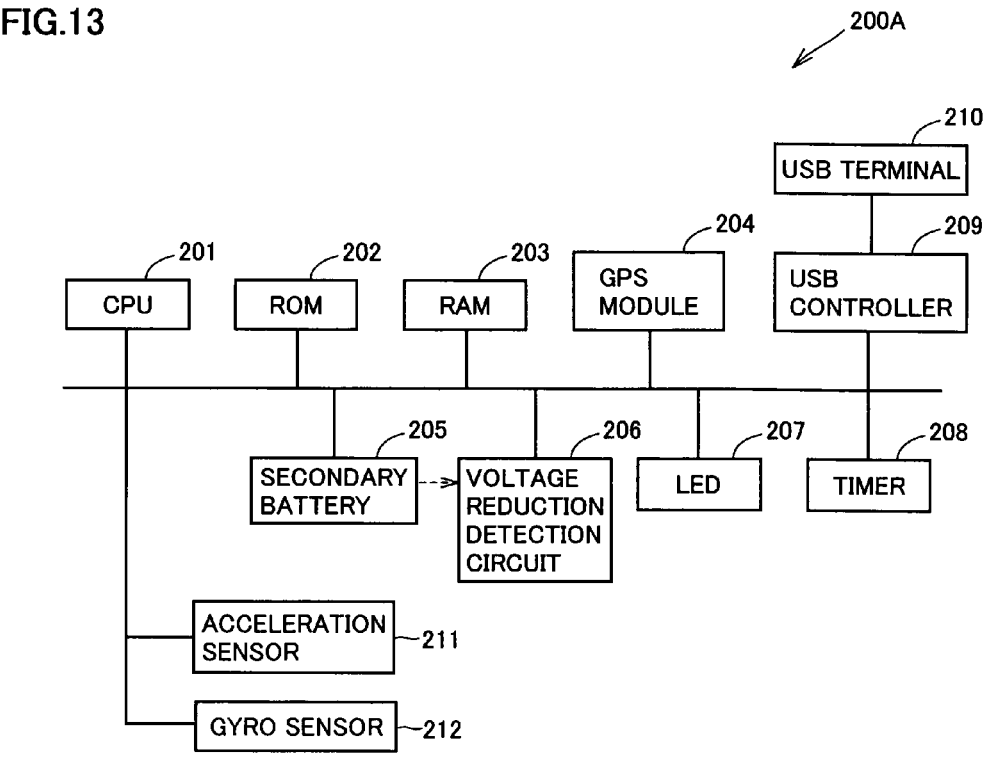

FIG.14

| MACHINE INSTALLATION INFORMATION M1A | INSTALLATION INFORMATION M10A | PLANNED INSTALLATION POSITION INFORMATION M11 ON MACHINE TOOL (LATITUDE AND LONGITUDE INFORMATION) |
| --- | --- | --- |
| | | POSITIONAL TOLERANCE INFORMATION M12 |
| | | PLANNED DATE INFORMATION M13 ON REMOVAL OPERATION |
| | | RANGE INFORMATION M15 |
| | IDENTIFICATION INFORMATION M20 | MACHINE NUMBER M21 OF MACHINE TOOL |
| | | NUMBER M22 OF SUBSTRATE HAVING CPU MOUNTED THEREON |
| | | MAC ADDRESS M23 |

FIG.16

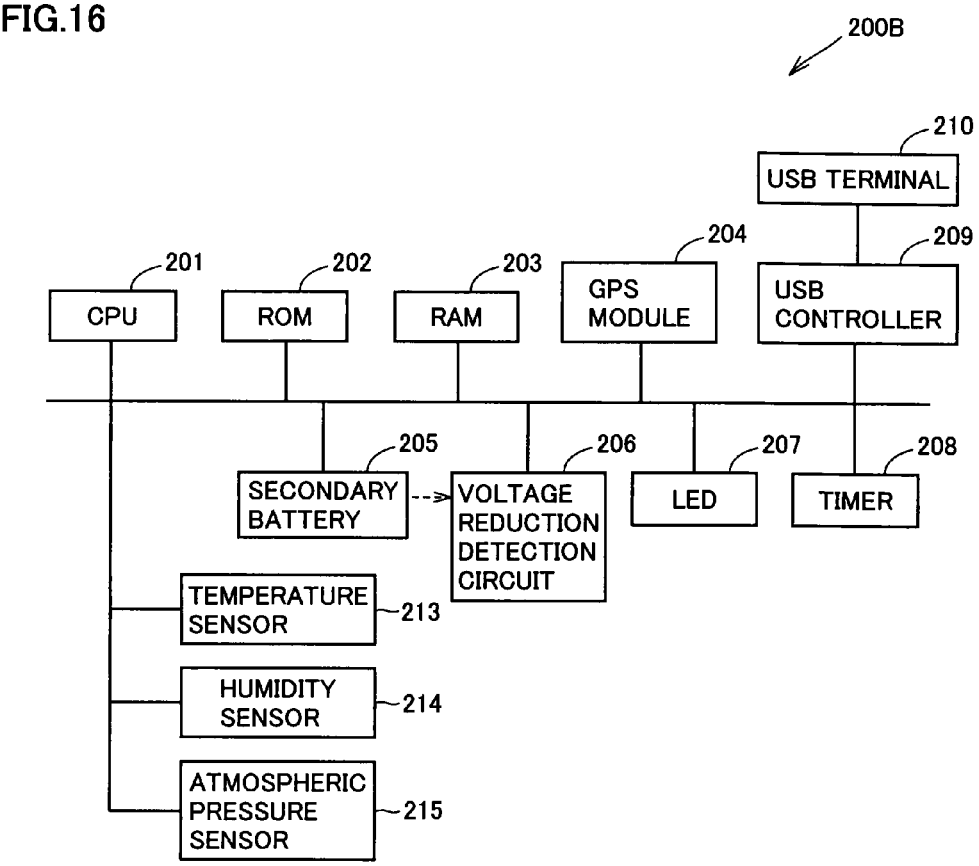

FIG.17

| MACHINE INSTALLATION INFORMATION M1B | INSTALLATION INFORMATION M10B | PLANNED INSTALLATION POSITION INFORMATION M11 ON MACHINE TOOL (LATITUDE AND LONGITUDE INFORMATION) |
|---|---|---|
| | | POSITIONAL TOLERANCE INFORMATION M12 |
| | | PLANNED DATE INFORMATION M13 ON REMOVAL OPERATION |
| | | TIME INFORMATION M16 |
| | IDENTIFICATION INFORMATION M20 | MACHINE NUMBER M21 OF MACHINE TOOL |
| | | NUMBER M22 OF SUBSTRATE HAVING CPU MOUNTED THEREON |
| | | MAC ADDRESS M23 |

ELECTRONIC EQUIPMENT, AND RESTRICTION REMOVAL METHOD

BACKGROUND OF THE INVENTION

1. Field of the Invention

The present invention relates to electronic equipment, and a restriction removal method using electronic equipment. More particularly, the present invention relates to electronic equipment for removing restriction on activation of a machine tool, and a restriction removal method for removing restriction on activation of a machine tool.

2. Description of the Background Art

Conventionally, systems for restricting activation of machine tools upon relocation of the machine tools in order to prohibit illegal use thereof (hereinafter referred to as "relocation sensing systems") are known.

Japanese Patent Laying-Open No. 2008-129706 discloses an activation restriction system for a machine tool as the relocation sensing system. This activation restriction system detects an installation position of a machine tool by using a GPS, and restricts activation or function of the machine tool if the detected installation position is beyond a previously registered allowable area.

On the other hand, if relocation sensed by the relocation sensing system is based on legal use, restriction on activation of a machine tool needs to be removed. In order to remove the restriction on activation imposed by the relocation sensing system, a unique removal code needs to be input to each machine tool. The removal code may be leaked during removal of the restriction on activation, however.

Japanese Patent Laying-Open No. 2009-251694 discloses a technique of using a removal code which is unique to each one of numerical control devices mounted on a machine tool and is only enabled for a predetermined number of times, for the numerical control devices. As a result, security during removal of restriction on activation is improved in Japanese Patent Laying-Open No. 2009-251694.

Japanese Patent Laying-Open No. 2010-3210 discloses a system for recovering a function of a numerical control device having the function of preventing relocation of a machine. Installation position information and an allowable movement distance are input to and stored in an FROM (Flash Read Only Memory) in the numerical control device via an input device. In this system, position information is input to the numerical control device from a GPS (Global Positioning System) unit via a GPS interface, and the position information is stored in a SRAM (Static Random Access Memory) in the numerical control device. A processor in the numerical control device reads a program stored in the FROM, and calculates a movement distance based on the position information and the installation position information. The processor determines whether or not the calculated movement distance is within a range of allowable movement distance, and if the movement distance is within the range of allowable movement distance, performs function recovery processing on the numerical control device.

With mere determination of whether or not the movement distance is within the allowable movement distance in the above configuration of the system in Japanese Patent Laying-Open No. 2010-3210, however, illegal position information on the GPS unit may be input. In order to prevent such illegal input, this system sets an allowable time based on time elapsed since detection of the position information with the GPS unit, and determines whether or not to transmit the position information from the GPS unit to the numerical control device.

SUMMARY OF THE INVENTION

In Japanese Patent Laying-Open No. 2009-251694, however, a service staff member can obtain the removal code from a server device by transmitting information about a machine tool which is an object of restriction removal, and ID and a password of the service staff member to the server device via Internet connection. Thus, a malicious service staff member may be able to obtain the removal code, and use the obtained removal code under user's control at a different unauthorized location to remove the restriction on activation imposed by the relocation sensing system. In Japanese Patent Laying-Open No. 2008-129706, a GPS device is incorporated into the machine tool itself to try to detect the position with the GPS. However, the installation location is indoors, and the GPS device cannot receive GPS radio waves, resulting in inability to function in reality. While it may be possible to latch and use GPS information immediately before the machine tool is brought indoors, a malicious service staff member can falsify the relocation location by blocking the function of a GPS antenna.

In Japanese Patent Laying-Open No. 2010-3210, if a malicious worker performs the function recovery processing, the worker may falsify the installation position information, and illegally perform the function recovery processing (removal of activation restriction) using the installation position information.

According to an aspect of the present invention, electronic equipment for removing activation restriction on a device is provided. The electronic equipment includes a current location position information acquisition unit configured to acquire current location position information on the electronic equipment, a device position information acquisition unit configured to acquire planned installation position information indicating a planned installation position of the device previously registered with a supplier-side storage device of the device from the supplier-side storage device, a first determination unit configured to determine whether or not the current location is within a predetermined range having the previously registered planned installation position as a base point, based on the current location position information acquired by the current location position information acquisition unit and the planned installation position information acquired by the device position information acquisition unit, and a second determination unit configured to determine, if the first determination unit determines that the current location is within the predetermined range having the planned installation position as a base point, whether or not a predetermined condition has been satisfied. The electronic equipment performs, if the second determination unit determines that the predetermined condition has been satisfied, information input processing on the device, to remove activation restriction on the device.

Preferably, the device position information acquisition unit acquires the planned installation position information from the supplier-side storage device through encrypted communication. The electronic equipment performs the information input processing on the device through encrypted communication.

Preferably, the second determination unit determines that the predetermined condition has been satisfied if it is within a predetermined time since the current location position information was acquired by the current location position information acquisition unit.

Preferably, the electronic equipment includes a movement distance detection unit configured to detect a movement distance of the electronic equipment after the current location position information was acquired by the current location position information acquisition unit. The second determination unit determines that the predetermined condition has been satisfied if the current location of the electronic equipment calculated based on the movement distance detected by the movement distance detection unit is within a predetermined range when the electronic equipment is connected to the device.

Preferably, the electronic equipment includes a communication device capable of communication only within a predetermined distance. The second determination unit determines that the predetermined condition has been satisfied if communication with the device has succeeded using the communication device within a predetermined time after the current location position information was acquired by the current location position information acquisition unit.

Preferably, the electronic equipment includes a weather information acquisition unit configured to acquire weather information including at least one of temperature, humidity, and atmospheric pressure outdoors. The second determination unit determines that the predetermined condition has been satisfied if a difference between weather information acquired by the weather information acquisition unit when the current location position information was acquired by the current location position information acquisition unit and weather information acquired by the weather information acquisition unit before a predetermined time prior to connection of the electronic equipment to the device is within a predetermined value.

According to another aspect of the present invention, a restriction removal method for removing activation restriction on a device by electronic equipment is provided. The restriction removal method includes the steps of acquiring, by a processor in the electronic equipment, current location position information on the electronic equipment, acquiring, by the processor, planned installation position information indicating a planned installation position of the device previously registered with a supplier-side storage device of the device from the supplier-side storage device, determining, by the processor, whether or not the current location is within a predetermined range having the previously registered planned installation position as a base point, based on the acquired current location position information and the acquired planned installation position information, determining, by the processor, if it is determined that the current location is within the predetermined range having the planned installation position as a base point, whether or not a predetermined condition has been satisfied, and performing, by the processor, if it is determined that the predetermined condition has been satisfied, information input processing on the device, to remove activation restriction on the device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a portion of a device included in a machine tool.

FIG. 6 shows a portion of data stored in a storage device in the machine tool.

FIG. 7 shows machine installation information M1 in machine installation information previously stored in a server device.

FIG. 13 shows a general configuration of the GPS dongle in the electronic equipment according to another embodiment.

FIG. 14 shows machine installation information M1A in the machine installation information previously stored in the server device.

FIG. 16 shows a general configuration of the GPS dongle in the electronic equipment according to yet another embodiment.

FIG. 17 shows machine installation information M1B in the machine installation information previously stored in the server device.

DESCRIPTION OF THE PREFERRED EMBODIMENTS

Figure 1:
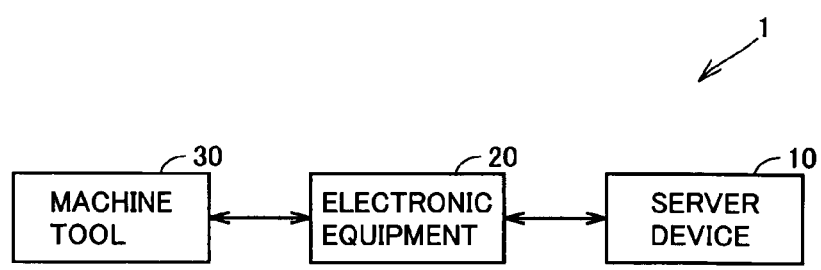
FIG. 1 shows a general configuration of an information processing system.

An information processing system according to an embodiment of the present invention will be described hereinafter with reference to the drawings. In the following description, the same components are designated with the same reference characters. Their names and functions are also the same. Thus, detailed descriptions thereof will not be repeated.

First Embodiment

Outline of Information Processing System

FIG. 1 shows a general configuration of an information processing system 1 according to the present embodiment. As shown in FIG. 1, information processing system 1 includes a server device 10, electronic equipment 20, and a machine tool 30. Each of server device 10 and machine tool 30 communicates with electronic equipment 20. Server device 10 is a device owned by a supplier of machine tool 30. The supplier refers to a machine tool manufacturer, or an operator authorized to perform maintenance of the machine tool by the machine tool manufacturer.

Machine tool 30 senses vibration of machine tool 30. When machine tool 30 senses the vibration, machine tool 30 restricts activation of machine tool 30 itself. In the following description, machine tool 30 senses the vibration, and activation of machine tool 30 is consequently restricted. The vibration may result from relocation of machine tool 30 or an earthquake, for example.

Server device 10 stores predetermined position information about the machine tool (hereinafter referred to as "planned installation position information"). The "planned installation position information" is information indicating a planned installation position of the machine tool.

Electronic equipment 20 acquires the position information from server device 10. Electronic equipment 20 also acquires current location position information on electronic equipment 20. Further, electronic equipment 20 compares the planned installation position information acquired from server device 10 with the current location position information. Specifically, electronic equipment 20 determines whether or not the current location is within a predetermined range having the planned installation position as a base point.

If it is determined that the current location is within the predetermined range having the planned installation position as a base point, electronic equipment 20 determines whether or not a predetermined condition has been satisfied. If it is determined that the predetermined condition has been satisfied, electronic equipment 20 performs information input processing on machine tool 30, to remove activation restriction (hereinafter also referred to as "restriction removal") on machine tool 30.

Electronic equipment 20 determines that the predetermined condition has been satisfied if it is within a predetermined time since acquisition of the current location position information. Namely, electronic equipment 20 performs the information input processing on machine tool 30 within the predetermined time since acquisition of the current location position information, to remove the activation restriction (hereinafter also referred to as "restriction removal") on machine tool 30. As a result, machine tool 30 is ready to be activated. Other examples of the "predetermined condition" will be described in other embodiments to be described later.

To ensure security, electronic equipment 20 acquires the planned installation position information from server device 10 through encrypted communication. Likewise, to ensure security, electronic equipment 20 performs the information input processing on machine tool 30 through encrypted communication.

In the following description, the case where electronic equipment 20 determines that the current location is within the predetermined range having the planned installation position as a base point is also referred to as a case where "matching of the position information has succeeded."

The outline of information processing system 1 is further described below. Electronic equipment 20 acquires identification information on machine tool 30 from machine tool 30. Electronic equipment 20 also acquires identification information from server device 10. Electronic equipment 20 acquires both pieces of identification information, and matches the identification information acquired from machine tool 30 with the identification information acquired from server device 10. If the matching of the identification information has succeeded, electronic equipment 20 transmits a removal signal for removing activation restriction on machine tool 30 to machine tool 30, as the information input processing. That is, if the matching of the position information and the matching of the identification information has succeeded, electronic equipment 20 transmits the removal signal to machine tool 30.

Figure 2:
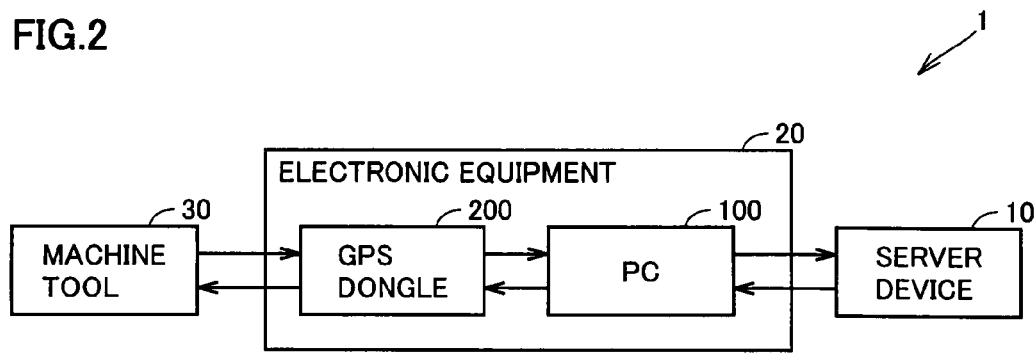
FIG. 2 shows a general configuration of electronic equipment.

FIG. 2 shows a general configuration of electronic equipment 20. Electronic equipment 20 includes a PC (Personal Computer) 100 and a GPS dongle 200. PC 100 and GPS dongle 200 are directly connected to each other such that they can communicate with each other. That is, PC 100 and GPS dongle 200 are directly connected to each other with no equipment interposed therebetween. The following description refers to an example where PC 100 and GPS dongle 200 are directly connected to each other via a USB (Universal Serial Bus). Since PC 100 needs to be moved, it is preferable that PC 100 be a notebook PC of high portability.

PC 100 is also connected to server device 10 such that they can communicate with each other. For example, PC 100 is connected to server device 10 such that they can communicate with each other over a network such as a LAN (Local Area Network). PC 100 conducts encrypted communication with server device 10.

GPS dongle 200 is further directly connected to machine tool 30 with no equipment interposed therebetween. In the following description, GPS dongle 200 is connected to machine tool 30 such that that they can communicate with each other via a USB. Specifically, a worker detaches GPS dongle 200 from PC 100, and then connects GPS dongle 200 to machine tool 30, such that GPS dongle 200 and machine tool 30 can communicate with each other.

A high level of security needs to be ensured for the connection between GPS dongle 200 and PC 100 by taking measures such as encryption for preventing stealing and tampering of data in USB communication. Similar measures are taken for the USB communication between GPS dongle 200 and machine tool 30 as well. These measures are implemented by a CPU included in GPS dongle 200. In addition, a device included in GPS dongle 200 may be resin molded to make probing with an oscilloscope and the like difficult.

A method of using electronic equipment 20 is more specifically described below. The worker brings PC 100 connected to GPS dongle 200 out of a building in which machine tool 30 is installed (a place that gives a good view of the sky, such as a parking area or a rooftop of the building), and acquires the current location position information with GPS dongle 200. Then, PC 100 performs matching of the position information. Further, the worker detaches GPS dongle 200 from PC 100, and connects GPS dongle 200 to machine tool 30. Then, GPS dongle 200 performs matching of the identification information.

Data (signal) transmitted and received among devices 10, 100, 200 and 30 in information processing system 1 will be described later.

<Hardware Configuration of PC 100>

Figure 3:
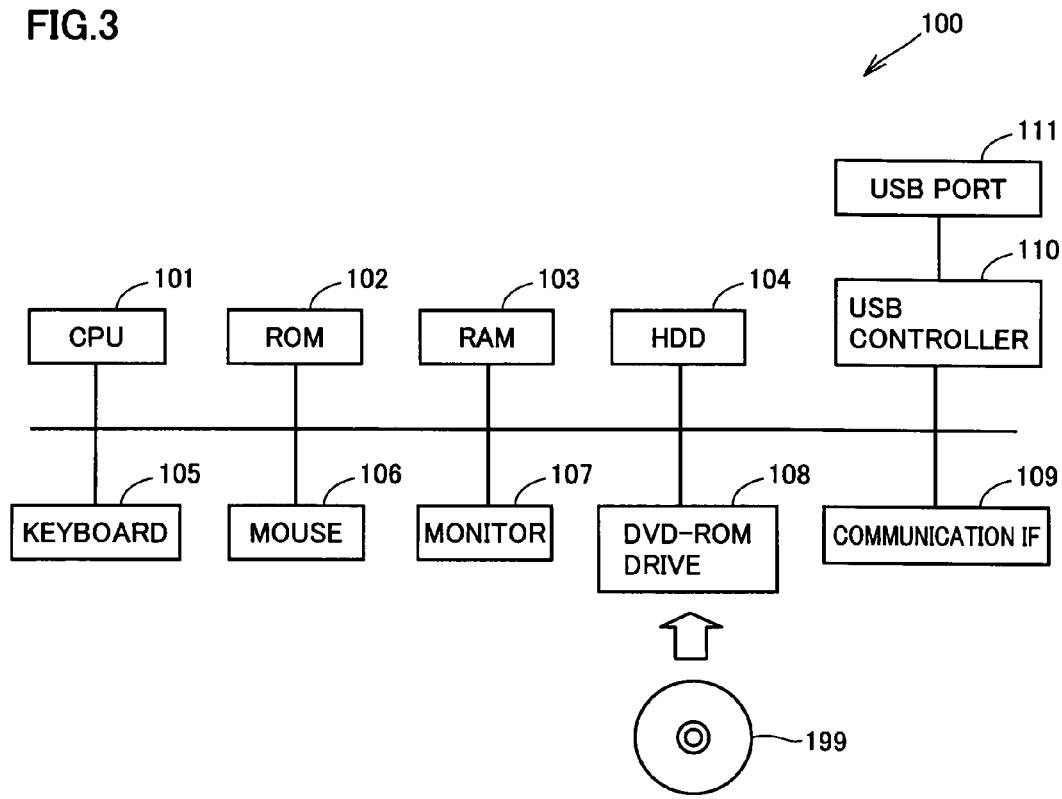
FIG. 3 is a block diagram showing a hardware configuration of a PC.

FIG. 3 is a block diagram showing a hardware configuration of PC 100. PC 100 includes, as main components, a CPU 101 for executing a program, a ROM (Read Only Memory) 102 for storing data in a nonvolatile manner, a RAM 103 for storing data created by execution of the program by CPU 101, or data input through a keyboard 105 or a mouse 106 in a volatile manner, an HDD (Hard Disk Drive) 104 for storing data in a nonvolatile manner, keyboard 105 and mouse 106 for accepting input of instructions from a user of PC 100, a monitor 107, a DVD (Digital Versatile Disk)-ROM drive 108, a communication IF 109, a USB controller 110, and a USB port 111.

The components except USB port 111 are connected to one another via a data bus. USB port 111 is connected to USB controller 110. USB port 111 is also connected to a USB terminal 210 (see FIG. 4) in GPS dongle 200. As a result, PC 100 can communicate with GPS dongle 200. A DVD-ROM 199 is inserted in DVD-ROM drive 108.

The processing in PC 100 is implemented by the components of the hardware, and software executed by CPU 101. Such software may be previously stored in HDD 104. Alternatively, the software may be stored in a recording medium such as DVD-ROM 199 and distributed as a program product. Alternatively, the software may be provided as a downloadable program product by an information provider connected to the so-called Internet. Such software is read from the recording medium by a reading device such as DVD-ROM drive 108, or downloaded via communication IF 109, and then temporarily stored in HDD 104. The software is read from HDD 104 by CPU 101, and stored in RAM 103 in the form of an executable program. CPU 101 executes the program.

The components constituting PC 100 shown in FIG. 3 are common components. Accordingly, it can be said that an essential part of the present invention lies in the software stored in the recording medium such as RAM 103, HDD 104 and DVD-ROM 199, or the software downloadable over a network. Operation of the components of the hardware in PC 100 is well known, and thus detailed description thereof will not be repeated.

The recording medium is not limited to a DVD-ROM, a CD (Compact Disk)-ROM, an FD (Flexible Disk), or a hard disk, but may be a medium for carrying a program in a fixed manner such as a semiconductor memory, which includes a magnetic tape, a cassette tape, an optical disc (MO (Magnetic Optical Disc)/MD (Mini Disc)/DVD (Digital Versatile Disc)), an IC (Integrated Circuit) card (which includes a memory card), an optical card, a mask ROM, an EPROM (Electronically Programmable Read-Only Memory), an EEPROM (Electronically Erasable Programmable Read-Only Memory), and a flash ROM. In addition, the recording medium is a non-transitory medium having the computer-readable program and the like.

The program as used herein includes not only a program directly executable by a CPU, but also a program in the form of a source program, a compressed program, an encrypted program and the like.

<Hardware Configuration of GPS Dongle 200>

Figure 4:
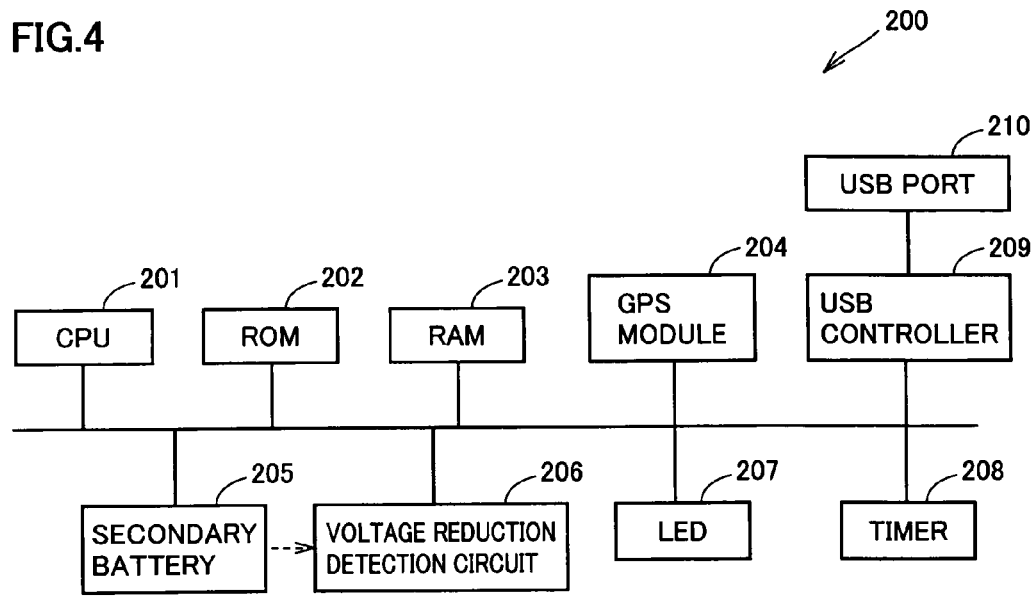
FIG. 4 is a block diagram showing a hardware configuration of a GPS dongle.

FIG. 4 is a block diagram showing a hardware configuration of GPS dongle 200. Referring to FIG. 4, GPS dongle 200 includes, as main components, a CPU 201 for executing a program, a ROM 202 for storing data in a nonvolatile manner, a RAM 203 for storing data in a volatile manner, a GPS module 204, a secondary battery 205, a voltage reduction detection circuit 206, an LED 207, a timer 208, a USB controller 209, and a USB terminal 210. The components except USB terminal 210 are connected to one another via a data bus. USB terminal 210 is connected to USB controller 209.

GPS module 204 measures a current position by receiving radio waves from a GPS satellite. GPS module 204 determines a latitude and a longitude. GPS module 204 may be a module having an integrated antenna, or a module having an external antenna.

GPS module 204 outputs the determined longitude and latitude (position information) to CPU 201. GPS module 204 also outputs date and time information included in the radio waves transmitted from the satellite to CPU 201. GPS module 204 further outputs reception quality of the radio waves to CPU 201.

Secondary battery 205 supplies power to CPU 201. Secondary battery 205 is a battery or a super capacitor. Secondary battery 205 supplies power to CPU 201 when GPS dongle 200 is detached from PC 100. That is, while GPS dongle 200 is connected to PC 100, CPU 201 receives power supply from PC 100.

Voltage reduction detection circuit 206 detects voltage reduction in secondary battery 205. The voltage reduction detection circuit outputs a detection result to CPU 201. LED 207 changes flashing and lighting patterns in response to an instruction from CPU 201. Timer 208 outputs a timing signal for timing the time to CPU 201. Timer 208 may be configured to output time information instead of the timing signal to CPU 201.

The processing in GPS Dongle 200 is implemented by the components of the hardware, and software executed by CPU 201. Such software is previously stored in ROM 202.

<As to Machine Tool 30>

FIG. 5 shows a portion of a device included in machine tool 30. Specifically, FIG. 5 shows a configuration used for controlling activation of machine tool 30.

As shown in FIG. 5, machine tool 30 includes a sensing device 31 for sensing vibration of machine tool 30, an activation restriction device 32 for restricting activation of machine tool 30, a CPU 33, a storage device 34 for storing various pieces of data, a USB controller 35, a USB port 36, and an NIC (Network Interface Card) 37.

When sensing device 31 senses vibration of machine tool 30, activation restriction device 32 restricts activation of machine tool 30. Specifically, activation restriction device 32 restricts activation of machine tool 30 by sending an instruction to CPU 33. Restricting activation of machine tool 30 refers to, for example, causing machine tool 30 to be unable to process a workpiece.

When USB port 36 is connected to USB terminal 210 of GPS dongle 200, machine tool 30 communicates with GPS dongle 200.

<As to Data>

FIG. 6 shows a portion of data stored in storage device 34 in machine tool 30. Referring to FIG. 6, storage device 34 stores identification information M90 on machine tool 30. Identification information M90 includes a machine number M91 of machine tool 30, a number M92 of a substrate having CPU 33 mounted thereon (hereinafter also referred to as "CPU substrate"), and a MAC address M93.

Machine number M91 is a unique number for identifying machine tool 30. Machine number M91 is given by the manufacturer of machine tool 30. Substrate number M92 is a unique number given to the CPU substrate in machine tool 30 by the manufacturer of machine tool 30. MAC address M93 is a MAC address assigned to NIC 37.

FIG. 7 shows machine installation information M1 in machine installation information previously stored in server device 10. The following description refers to an example where machine installation information M1 is selected by the worker of electronic equipment 20.

Machine installation information M1 is registered with server device 10 when activation restriction on machine tool 30 needs to be removed. The registration of machine installation information M1 with server device 10 is done in a secure environment. In addition, the registration is approved by an official having sufficient authority. By being approved, machine installation information M1 can be utilized for subsequent restriction removal.

Referring to FIG. 7, machine installation information M1 includes installation information M10 and identification information M20. Installation information M10 includes planned installation position information M11 on machine tool 30, positional tolerance information M12, planned date information M13 on removal operation, and operation timer information M14.

Planned installation position information M11 is information indicating a latitude and a longitude. Tolerance information M12 is information indicating a positional error that is tolerated during matching of the position information in PC 100. The tolerance may be a distance of about 1 km, for example.

Planned date information M13 is information indicating a planned date for removing activation restriction on the machine tool. As planned date information M13, a time period of about three days including the planned operation date and the days before and after the planned operation date is indicated, for example.

Operation timer information M14 is time information used in GPS dongle 200 if PC 100 succeeded in matching the position information. Operation timer information M14 is information indicating a time of about 5 to 10 minutes, for example. A method of using operation timer information M14 will be described later.

Identification information M20 includes a machine number M21 of the machine tool, a number M22 of a substrate having a CPU of the machine tool mounted thereon, and a MAC address M23. Machine number M21 is a unique number for identifying the machine tool. Machine number M21 is given by the manufacturer of the machine tool. Substrate number M22 is a unique number given to the CPU substrate of the machine tool by the manufacturer of the machine tool. MAC address M23 is a MAC address assigned to the NIC.

<Functional Configuration of PC 100>

Figure 8:
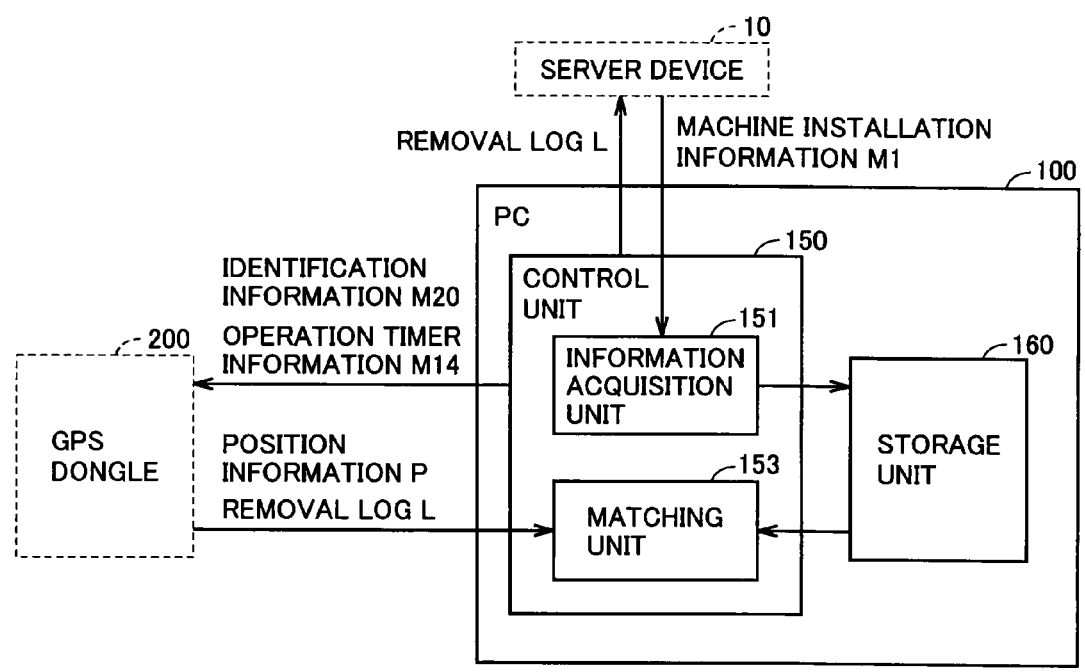
FIG. 8 is a block diagram illustrating a functional configuration of the PC.

FIG. 8 is a block diagram illustrating a functional configuration of PC 100. Referring to FIG. 8, PC 100 includes a control unit 150 and a storage unit 160. Control unit 150 includes an information acquisition unit 151 and a matching unit 153. RAM 103 and HDD 104 (see FIG. 3) correspond to storage unit 160.

PC 100 receives, while being directly connected to GPS dongle 200, an application starting key ("appli-starting key Q" hereinafter) from GPS dongle 200 in response to an instruction from the worker. Upon receiving appli-starting key Q, PC 100 starts a dedicated application. This dedicated application is previously stored in storage unit 160.

In response to an instruction from the worker who utilized the dedicated application, information acquisition unit 151 acquires machine installation information M1 (see FIG. 7) from server device 10. Information acquisition unit 151 stores acquired machine installation information M1 in storage unit 160.

In order to prevent information leakage to a third party, or misconduct concerning restriction removal operation through information analysis by a malicious worker, machine installation information M1 is acquired from server device 10 in a secure environment using an HTTPS (Hypertext Transfer Protocol Security) protocol with the dedicated application and the like. PC 100 performs suitable encryption to prevent tampering of information contents when storing machine installation information M1 in storage unit 160. A code used for the encryption is embedded in the dedicated application of PC 100 to prevent stealing.

If it is determined that PC 100 is directly connected to GPS dongle 200, matching unit 153 acquires the current location position information (hereinafter referred to as "position information P") from GPS dongle 200 in response to an instruction from the worker. Then, matching unit 153 matches the position information acquired from GPS dongle 200 with planned installation position information M11 in machine installation information M1 stored in storage unit 160. That is, matching unit 153 determines whether or not the current location is within a predetermined range having the planned installation position as a base point. Here, if planned installation position information M11 acquired from server device 10 and position information P acquired from GPS dongle 200 are in a positional relation within the error indicated in tolerance information M12, matching unit 153 determines that the matching of the position information has succeeded.

Matching unit 153 further determines whether or not the date and time information acquired from GPS dongle 200 is included in the time period indicated in planned date information M13 in machine installation information M1 stored in storage unit 160.

If the matching of the position information and the matching of the date and time information by matching unit 153 has succeeded, control unit 150 transmits identification information M20 and operation timer information M14 in machine installation information M1 stored in storage unit 160 to GPS dongle 200.

As will be described in detail later, if activation restriction on machine tool 30 is removed, PC 100 receives a removal log L from GPS dongle 200, and transmits it to server device 10. Removal log L records identification information M90 on machine tool 30, and the date and time information acquired from the GPS satellite.

The transmission of removal log L to server device 10 is specifically made in the following procedure. First, the worker returns to a place where PC 100 can be connected to server device 10. Next, the worker starts the dedicated application of PC 100. Then, the worker transmits locally stored removal log L from the application to server device 10 over a network. By receiving removal log L, server device 10 can store machine information on the machine tool having been subjected to restriction removal, location (latitude and longitude), and date and time of operation. As a result, all data required for traceability is configured in server device 10.

PC 100 may be configured not to perform the matching of the date and time information. In this case, if matching unit 153 has only succeeded in matching the position information, control unit 150 transmits identification information M20 and operation timer information M14 to GPS dongle 200.

<Functional Configuration of GPS Dongle 200>

Figure 9:
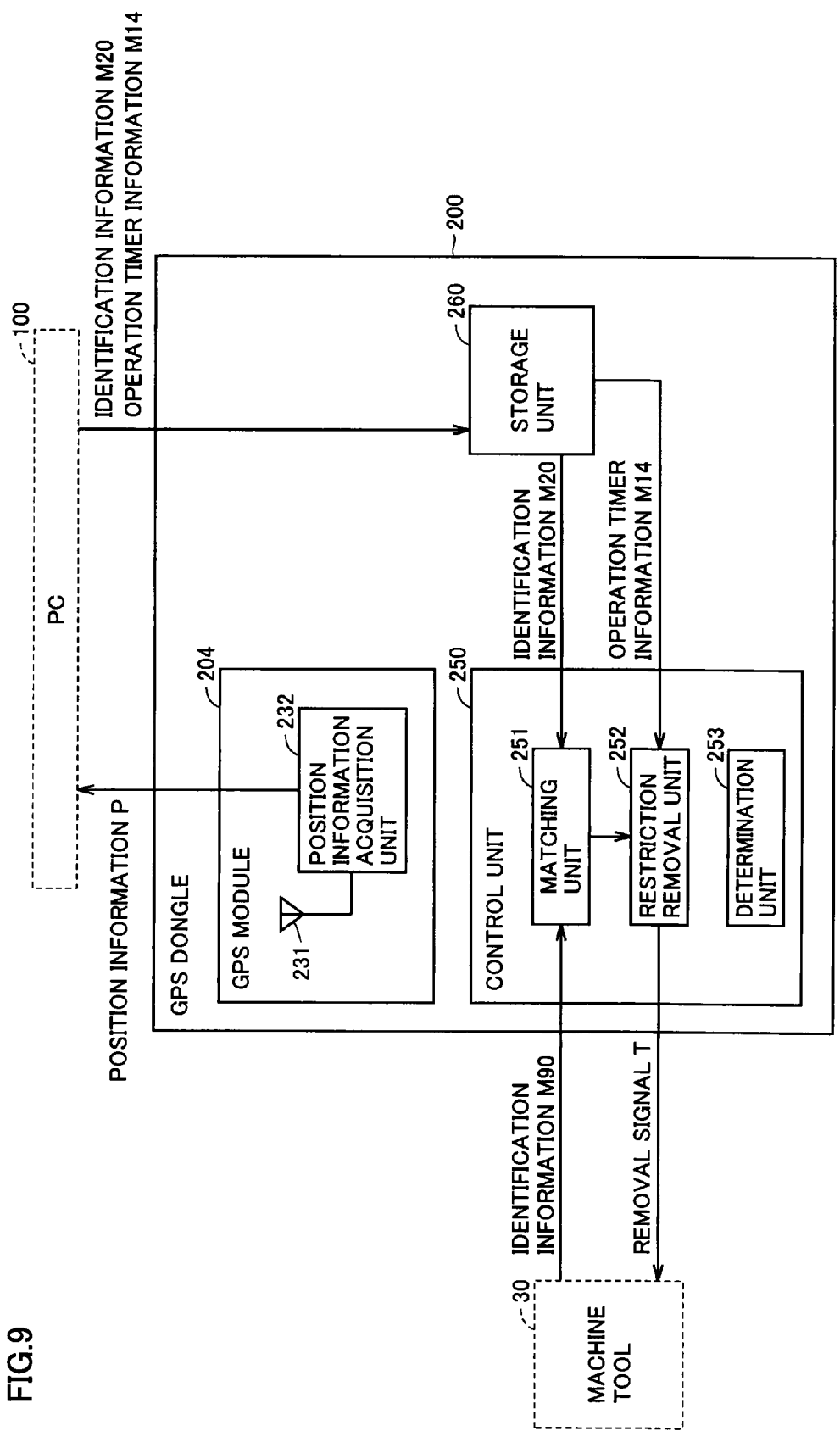
FIG. 9 is a block diagram illustrating a functional configuration of the GPS dongle.

FIG. 9 is a block diagram illustrating a functional configuration of GPS dongle 200. Referring to FIG. 9, GPS dongle 200 includes a GPS module 204, a control unit 250, and a storage unit 260. GPS module 204 includes an antenna 231 and a position information acquisition unit 232. Control unit 250 includes a matching unit 251, a restriction removal unit 252, and a determination unit 253. ROM 202 and RAM 203 (see FIG. 4) correspond to storage unit 260.

Antenna 231 receives radio waves from a GPS satellite. Position information acquisition unit 232 acquires current location position information P based on the received radio waves. Position information acquisition unit 232 transmits acquired position information P to PC 100 connected thereto via the USB. In addition, GPS module 204 transmits the date and time information described above to PC 100.

GPS dongle 200 receives, while being connected to PC 100, identification information M20 and operation timer information M14 from PC 100. GPS dongle 200 stores received identification information M20 and operation timer information M14 in a volatile storage area (RAM area) of storage unit 260.

Determination unit 253 determines whether or not there is a communication device interposed between PC 100 and GPS dongle 200. That is, determination unit 253 determines whether or not PC 100 and GPS dongle 200 are directly connected to each other.

For example, determination unit 253 checks in terms of software whether or not there is a device such as a hub for forwarding a protocol between PC 100 and GPS dongle 200. If a device connected other than during normal connection is detected, PC 100 disconnects the connection to avoid interception of communication between PC 100 and GPS dongle 200.

Determination unit 253 determines whether or not there is a communication device interposed between machine tool 30 and GPS dongle 200. That is, determination unit 253 determines whether or not machine tool 30 and GPS dongle 200 are directly connected to each other.

For example, determination unit 253 checks in terms of software whether or not there is a device such as a hub for forwarding a protocol between GPS dongle 200 and machine tool 30. If a device connected other than during normal connection is detected, GPS dongle 200 disconnects the connection. When a cable is simply extended without a communication hub or the like, a communication signal is degraded. For this reason, a distance between machine tool 30 and GPS dongle 200 is limited to a short distance (about several tens of meters).

Upon receiving operation timer information M14, restriction removal unit 252 starts a countdown of the time. Restriction removal unit 252 performs the countdown by using operation timer information M14 stored in storage unit 260 and timer 208 (see FIG. 4). That is, restriction removal unit 252 performs a countdown with the time indicated in operation timer information M14 as a starting point, in response to a timing signal output from timer 208. For example, restriction removal unit 252 performs a 10-minute countdown at one second intervals.

With GPS dongle 200 detached from PC 100 and connected to machine tool 30, matching unit 251 acquires identification information M90 (see FIG. 6) from machine tool 30. Matching unit 251 also reads identification information M20 from storage unit 260. Then, matching unit 251 matches identification information M90 with identification information M20. If the matching has succeeded, matching unit 251 sends a predetermined instruction to restriction removal unit 252. Operation for performing this processing is conducted with application software previously stored in machine tool 30.

If restriction removal unit 252 receives the predetermined instruction from matching unit 251 within the time indicated in operation timer information M14, restriction removal unit 252 transmits a removal signal T to machine tool 30. That is, if restriction removal unit 252 receives the predetermined instruction from matching unit 251 before the remaining time in the countdown reaches 0 second, restriction removal unit 252 transmits removal signal T to machine tool 30.

When machine tool 30 receives removal signal T, the activation restriction on machine tool 30 can be removed. if the activation restriction on machine tool 30 is removed, GPS dongle 200 receives removal log L from machine tool 30, and sends it to PC 100.

After the remaining time in the countdown reaches 0 second, GPS dongle 200 fails in matching the identification information. In this case, GPS dongle 200 cannot transmit removal signal T. As such, the restriction removal processing with GPS dongle 200 needs to be performed before the remaining time reaches 0 second. When the remaining time reaches 0 second, the worker needs to perform the operation again from the process of acquiring the position information with GPS module 204.

Since identification information M20 is stored in the volatile storage area, identification information M20 is deleted when secondary battery 205 in GPS dongle 200 (FIG. 4) runs out of power. Secondary battery 205 runs out of power in about 15 minutes from a fully charged state, for example, without power supply from PC 100.

When the remaining time in the countdown reaches 0 second, when the restriction removal for the machine tool is completed, and when the secondary battery runs out of power, identification information M20 is deleted, and the restriction removal function is disabled.

In addition, GPS dongle 200 informs the worker of various pieces of information by changing a light emission mode (e.g., a lighting pattern) of LED 207 (see FIG. 4). For example, LED 207 indicates whether or not the removal function of the dongle is being enabled. LED 207 also indicates a time until the end of the period during which the restriction can be removed. Further, LED 207 indicates a warning about voltage reduction in secondary battery 205.

Moreover, GPS dongle 200 checks in terms of software whether or not there is a device such as a hub for forwarding a protocol between GPS dongle 200 and machine tool 30. If a device connected other than during normal connection is detected, GPS dongle 200 disconnects the connection. When a cable is simply extended without a communication hub or the like, a communication signal is degraded. For this reason, a distance between GPS dongle 200 and machine tool 30 is limited to a short distance (about several tens of meters).

The time between when GPS dongle 200 acquires current location position information P and when GPS dongle 200 receives operation timer information M14 from PC 100 is very short compared to the time indicated in operation timer information M14 (e.g., about 5 to 10 minutes as described above). Accordingly, it can be said that electronic equipment 20 (specifically GPS dongle 200) has the function of removing activation restriction on machine tool 30 by performing the information input processing on machine tool 30 within a predetermined time since acquisition of the current location position information (before elapse of the predetermined time).

<Timing Chart>

Figure 10:
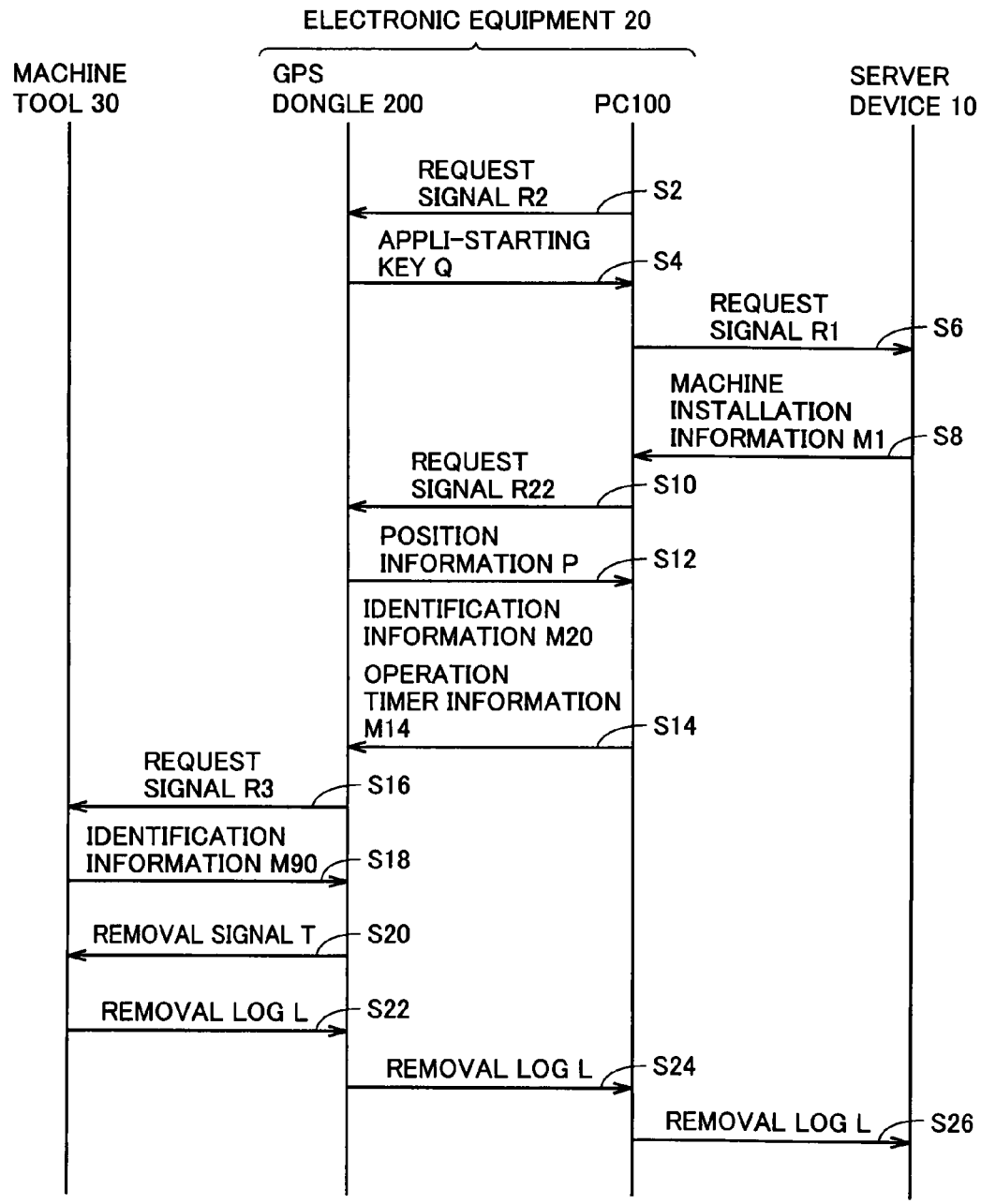
FIG. 10 shows a timing chart in the information processing system.

FIG. 10 shows a timing chart in information processing system 1. At step S2, PC 100 transmits a request signal R2 requesting appli-starting key Q and position information P to GPS dongle 200 directly connected to PC 100 via the USB. At step S4, GPS dongle 200 transmits appli-starting key Q to PC 100.

At step S6, PC 100 transmits a request signal R1 requesting machine installation information M1 to server device 10. At step S8, server device 10 transmits machine installation information M1 to PC 100.

At step S10, PC 100 transmits a request signal R22 requesting position information P to GPS dongle 200. At step S12, GPS dongle 200 transmits position information P to PC 100. If matching of the position information has succeeded, at step S14, PC 100 transmits identification information M20 and operation timer information M14 to GPS dongle 200. The series of operations from acquisition of position information P to transmission of operation timer information M14 to the dongle are continuously performed, and the process is completed in a sufficiently short time compared to the time indicated in operation timer information M14.

After the process of step S14 is completed, GPS dongle 200 is detached from PC 100, and connected to machine tool 30 via a USB. At step S16, GPS dongle 200 transmits a request signal R3 requesting identification information M90 on machine tool 30 to machine tool 30. Machine tool 30 receives request signal R3, and at step S18, transmits identification information M90 to GPS dongle 200.

If matching of the identification information has succeeded, at step S20, GPS dongle 200 transmits removal signal T to machine tool 30. When activation restriction on machine tool 30 is removed, at step S22, machine tool 30 transmits removal log L to GPS dongle 200.

After the process of step S22 is completed, GPS dongle 200 is detached from machine tool 30, and connected to PC 100 via a USB. At step S24, GPS dongle 200 transmits removal log L to PC 100. At step S26, PC 100 transmits removal log L received from GPS dongle 200 to server device 10 over a network.

<Control Configuration>

Figure 11:
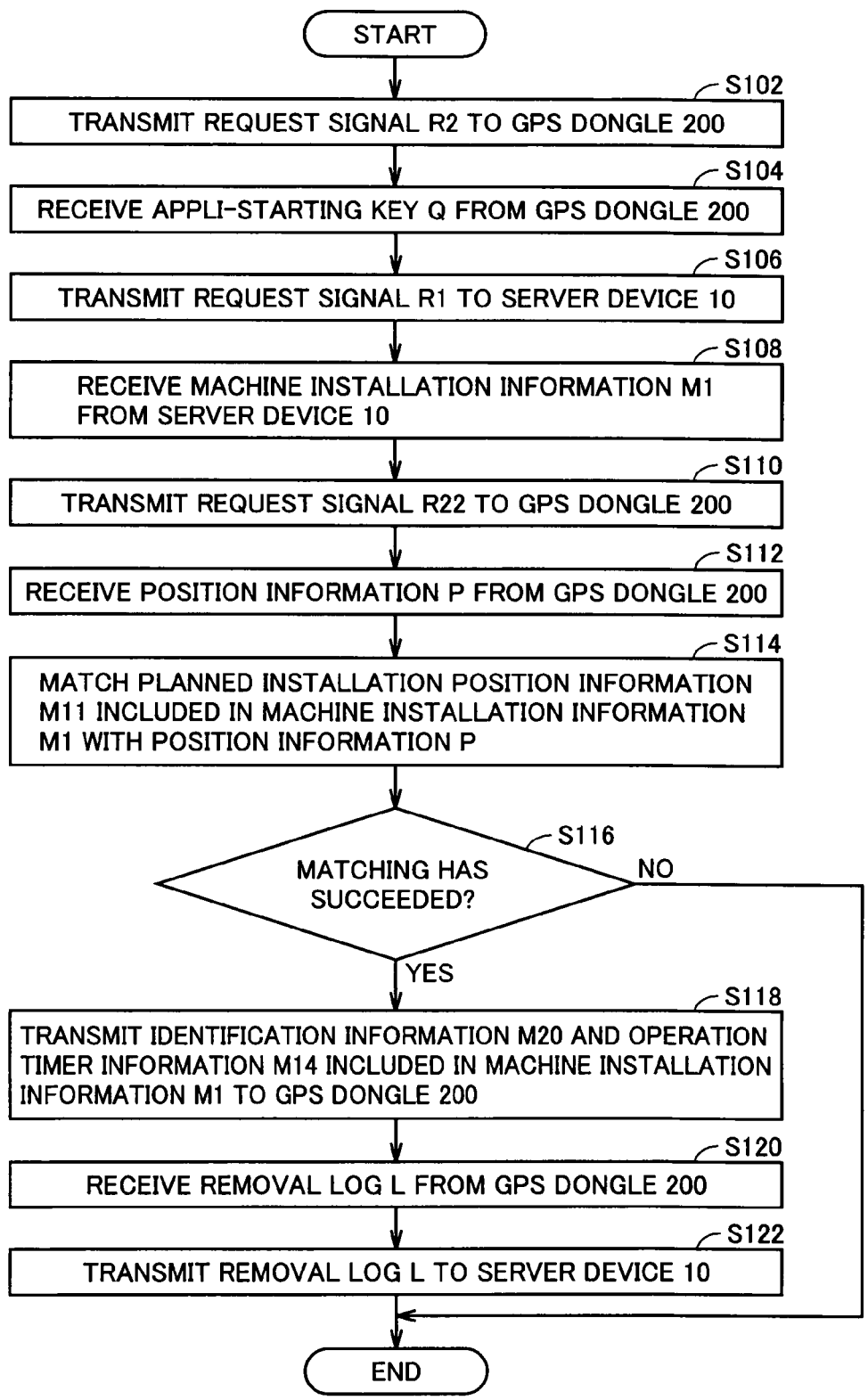
FIG. 11 is a flowchart showing a process flow in the PC.

FIG. 11 is a flowchart showing a process flow in PC 100. At step S102, PC 100 transmits request signal R2 to GPS dongle 200. At step S104, PC 100 receives appli-starting key Q. At step S106, PC 100 transmits request signal R1 to server device 10. At step S108, PC 100 receives machine installation information M1 from server device 10. At step S110, PC 100 transmits request signal R22 to GPS dongle 200. At step S112, PC 100 receives position information P from GPS dongle 200

At step S114, PC 100 matches planned installation position information M11 included in machine installation information M1 with position information P received from GPS dongle 200. At step S116, PC 100 determines whether or not the matching has succeeded. If it is determined that the matching has succeeded (YES at step S116), at step S118, PC 100 transmits identification information M20 and operation timer information M14 included in machine installation information M1 to GPS dongle 200. If it is determined that the matching has not succeeded (NO at step S116), PC 100 ends the process for removing the activation restriction.

At step S120, PC 100 receives removal log L from GPS dongle 200. At step S122, PC 100 transmits received removal log L to server device 10.

Figure 12:
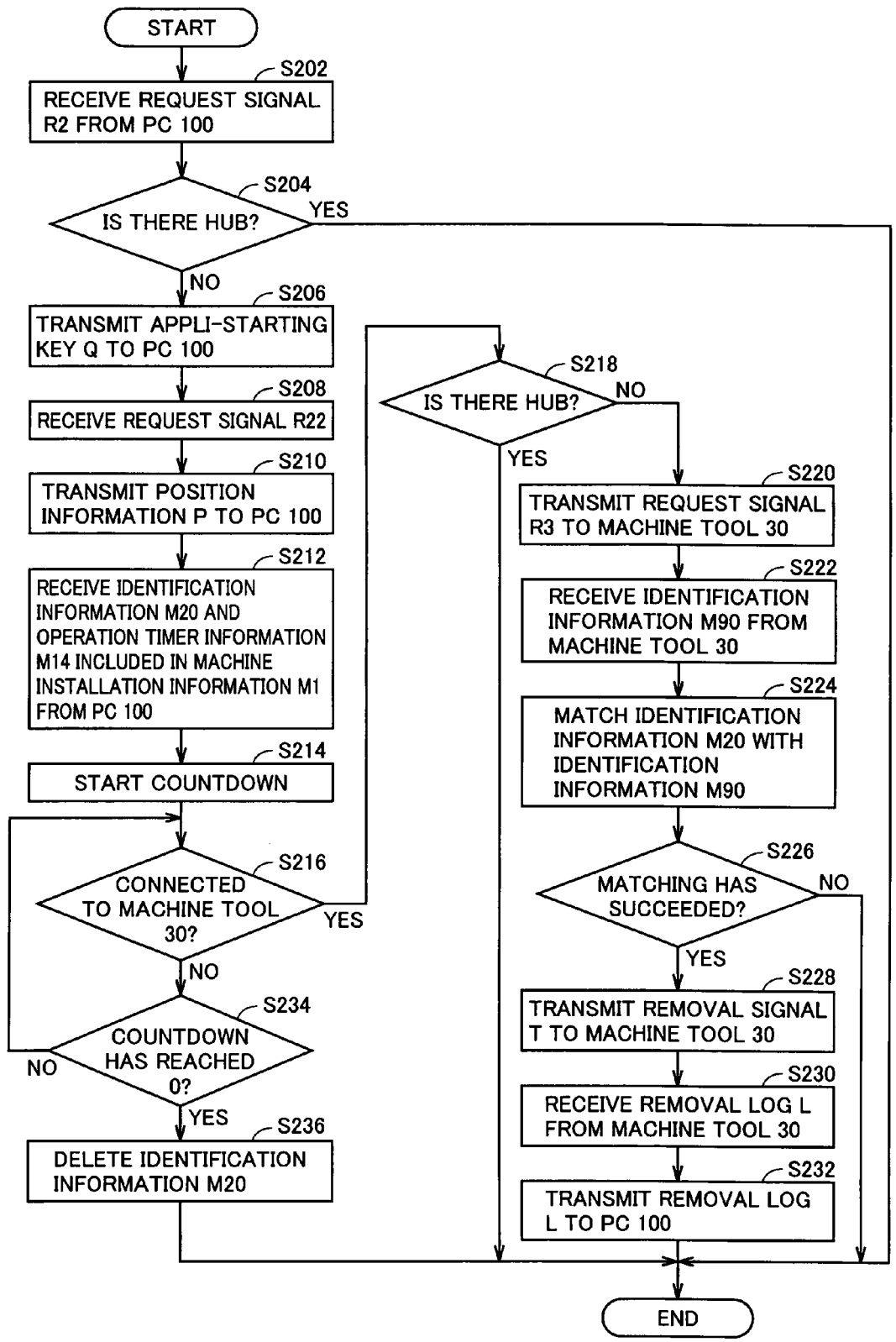
FIG. 12 is a flowchart showing a process flow in the GPS dongle.

FIG. 12 is a flowchart showing a process flow in GPS dongle 200. At step S202, GPS dongle 200 receives request signal R2 from PC 100. At step S204, GPS dongle 200 determines whether or not there is a hub (unexpected device) on the communication path. If it is determined that there is a hub (YES at step S204), GPS dongle 200 ends the process. If it is determined that there is not a hub (NO at step S204), at step S206, GPS dongle 200 transmits appli-starting key Q to PC 100.

At step S208, GPS dongle 200 receives request signal R22 from PC 100. At step S210, GPS dongle 200 transmits position information P to PC 100.

At step S212, GPS dongle 200 receives identification information M20 and operation timer information M14 included in machine installation information M1 from PC 100. Upon receiving operation timer information M14, at step S214, GPS dongle 200 starts a countdown based on operation timer information M14. At step S216, GPS dongle 200 determines whether or not GPS dongle 200 has been connected to machine tool 30.

If it is determined that GPS dongle 200 has been connected to machine tool 30 (YES at step S216), at step S218, GPS dongle 200 determines whether or not there is a hub (unexpected device) on the communication path. If it is determined that there is a hub (YES at step S218), GPS dongle 200 ends the restriction removal process. If it is determined that there is not a hub (NO at step S218), at step S220, GPS dongle 200 transmits request signal R3 to machine tool 30.

At step S222, GPS dongle 200 receives identification information M90 from machine tool 30. At step S224, GPS dongle 200 matches identification information M20 with identification information M90.

At step S226, GPS dongle 200 determines whether or not the matching of identification information M20 with identification information M90 has succeeded. If the matching has failed (NO at step S226), GPS dongle 200 ends the process.

At step S228, GPS dongle 200 transmits removal signal T to machine tool 30. At step S230, GPS dongle 200 receives removal log L from machine tool 30. At step S232, GPS dongle 200 transmits received removal log L to PC 100.

If it is determined that GPS dongle 200 has not been connected to machine tool 30 (NO at step S216), at step S234, GPS dongle 200 determines whether or not the countdown based on operation timer information M14 has reached 0. If it is determined that the countdown has reached 0 (YES at step S234), at step S236, GPS dongle 200 deletes identification information M20, and ends the process. If it is determined that the countdown has not reached 0 (NO at step S234), GPS dongle 200 returns the process to step S216.

<Conclusion>

With the configuration of information processing system 1 as described above, the following become possible.

In general, one way to attach a device for detecting whether or not the installation location is correct to an object machine is to incorporate a GPS unit into the object machine. However, if the object machine is a machine tool, for example, the installation location of the machine tool is usually indoors, and so the position thereof cannot be detected with a GPS. In order to detect the location of machine tool 30 installed indoors, therefore, distance is replaced with time in information processing system 1. That is, if the worker can go to machine tool 30 with the lapse of a very short time from the time when the position was detected with GPS module 204, it is ensured that a distance between the position detected with GPS module 204 and the installation location of machine tool 30 is not so apart from each other.

Accordingly, in information processing system 1, the worker goes outside and obtains global position information with GPS dongle 200. Further, in information processing system 1, GPS dongle 200 used for the position detection functions as an activation restriction removal key for machine tool 30.

With information processing system 1, therefore, the installation location of the machine tool can be controlled within an error of about several hundreds of meters in radius. Consequently, the risk that the machine tool is transported to a third country and a malicious worker resets the relocation sensing function of the machine tool, and the risk of restart due to password leakage resulting from disguise as a worker can be reduced.

In particular, since server device 10 is a device owned by the supplier of machine tool 30, a worker not authorized to operate server device 10 (e.g., a worker performing removal operation at the location where machine tool 30 is installed) cannot register planned installation position information M11 with server device 10. This worker cannot change planned installation position information M11 in server device 10, either.

Thus, even if a malicious worker performs the removal operation, the worker cannot remove the restriction on machine tool 30 in positions other than the planned installation position registered with server device 10. With information processing system 1, therefore, illegal removal of the activation restriction on machine tool 30 can be prevented.

If only the data in GPS dongle 200 which acquired the position information is input to machine tool 30 over a long distance through communication means such as the Internet, the method of replacing distance with time is not viable. For this reason, as described above, GPS dongle 200 also has the function of determining absence of a device (such as a hub) serving as distance extension means between GPS dongle 200 and machine tool 30, during communication connection with machine tool 30. Thus, GPS dongle 200 can disconnect the connection if a device connected other than during normal connection is detected. On the other hand, a cable may be simply extended without a communication hub or the like. In this case, however, a communication signal is degraded. For this reason, a distance between GPS dongle 200 and machine tool 30 is limited to a short distance (about several tens of meters). Consequently, the control function to be performed by information processing system 1 is sufficiently ensured.

Further, as described above, information processing system 1 checks that GPS dongle 200 is directly connected to machine tool 30. With this configuration, it can be ensured that GPS dongle 200 acquires the position information in the vicinity of machine tool 30. Likewise, by determining that GPS dongle 200 is directly connected to PC 100, interception of commutation for restriction removal is prevented.

<Modifications>

(1) In order to reduce the risk that the information in USB communication between GPS dongle 200 and PC 100 is browsed and emulated, it is preferable to scramble the information in addition to encrypting the information in USB communication. Scrambling allows a flow of random information in USB communication at all times, making extraction of correct information difficult. The originally required information is infrequently transmitted and received. In addition, the data itself is encrypted to make information stealing and tampering difficult. By combining these methods, a high level of security can be ensured. The same measures are taken when checking connection between machine tool 30 and GPS dongle 200.

(2) GPS dongle 200 may be configured as a simple object by allowing reduction in security function and omitting some of the functions. Alternatively, the indicated functions of GPS dongle 200 may be partially performed by an external PC or the like. Conversely, information for restricting activation other than the installation location and the machine number (e.g., enabled period information such as a lease cost, a maintenance contract cost) can be included so as not to provide permission of use.

(3) The connection between server device 10 and PC 100 may be made by cable or by radio. In either case, machine installation information M1 can be acquired from server device 10 as long as PC 100 is in a location where it can communicate with server device 10.

(4) In the foregoing description, electronic equipment 20 performs the matching of the position information and the matching of the identification information. This is not restrictive, however, and electronic equipment 20 may be configured not to perform the matching of the identification information. That is, electronic equipment 20 may be configured to transmit removal signal T to machine tool 30 if electronic equipment 20 has succeeded in matching the position information. In this case, identification information M20 in machine installation information M1 and identification information M90 stored in machine tool 30 is unnecessary.

Second Embodiment

In the first embodiment discussed above, the configuration for removing the activation restriction on machine tool 30 by performing the information input processing on machine tool 30 within the predetermined time since GPS dongle 200 in electronic equipment 20 acquired the current location position information was described. In the present embodiment, a configuration for removing the activation restriction based on a movement distance of the electronic equipment instead of the time as in the first embodiment is described.

FIG. 13 shows a general configuration of a GPS dongle 200A in electronic equipment 20 according to the present embodiment. Referring to FIG. 13, GPS dongle 200A includes, as main components, CPU 201 for executing a program, ROM 202 for storing data in a nonvolatile manner, RAM 203 for storing data in a volatile manner, GPS module 204, secondary battery 205, voltage reduction detection circuit 206, LED 207, timer 208, USB controller 209, USB terminal 210, an acceleration sensor 211, and a gyro sensor 212. The components except USB terminal 210 are connected to one another via a data bus.

Acceleration sensor 211 detects acceleration (i.e., change in speed per unit time) of GPS dongle 200A. CPU 201 stores the detected acceleration in RAM 203. Gyro sensor 212 detects an angle and an angular speed of GPS dongle 200A. CPU 201 associates the detected angle and angular speed with the detected acceleration, and stores them in RAM 203. A method of using a detection result from acceleration sensor 211 and a detection result from gyro sensor 212 will be described later.

The processing in GPS dongle 200A is implemented by the components of the hardware, and software executed by CPU 201. Such software is previously stored in ROM 202.

FIG. 14 shows machine installation information M1A in the machine installation information previously stored in server device 10 in the present embodiment. Referring to FIG. 14, machine installation information M1A includes installation information M10A and identification information M20. Installation information M10A includes planned installation position information M11 on machine tool 30, positional tolerance information M12, planned date information M13 on removal operation, and range information M15. Machine installation information M1A shown in FIG. 14 is different from machine installation information M1 shown in FIG. 7 in that range information M15 is included instead of operation timer information M14.

Range information M15 is information indicating an area, and is indicated with a latitude and a longitude. The area indicated in range information M15 includes the planned installation position indicated in planned installation position information M11 A method of using range information M15 will be described later.

Figure 15:
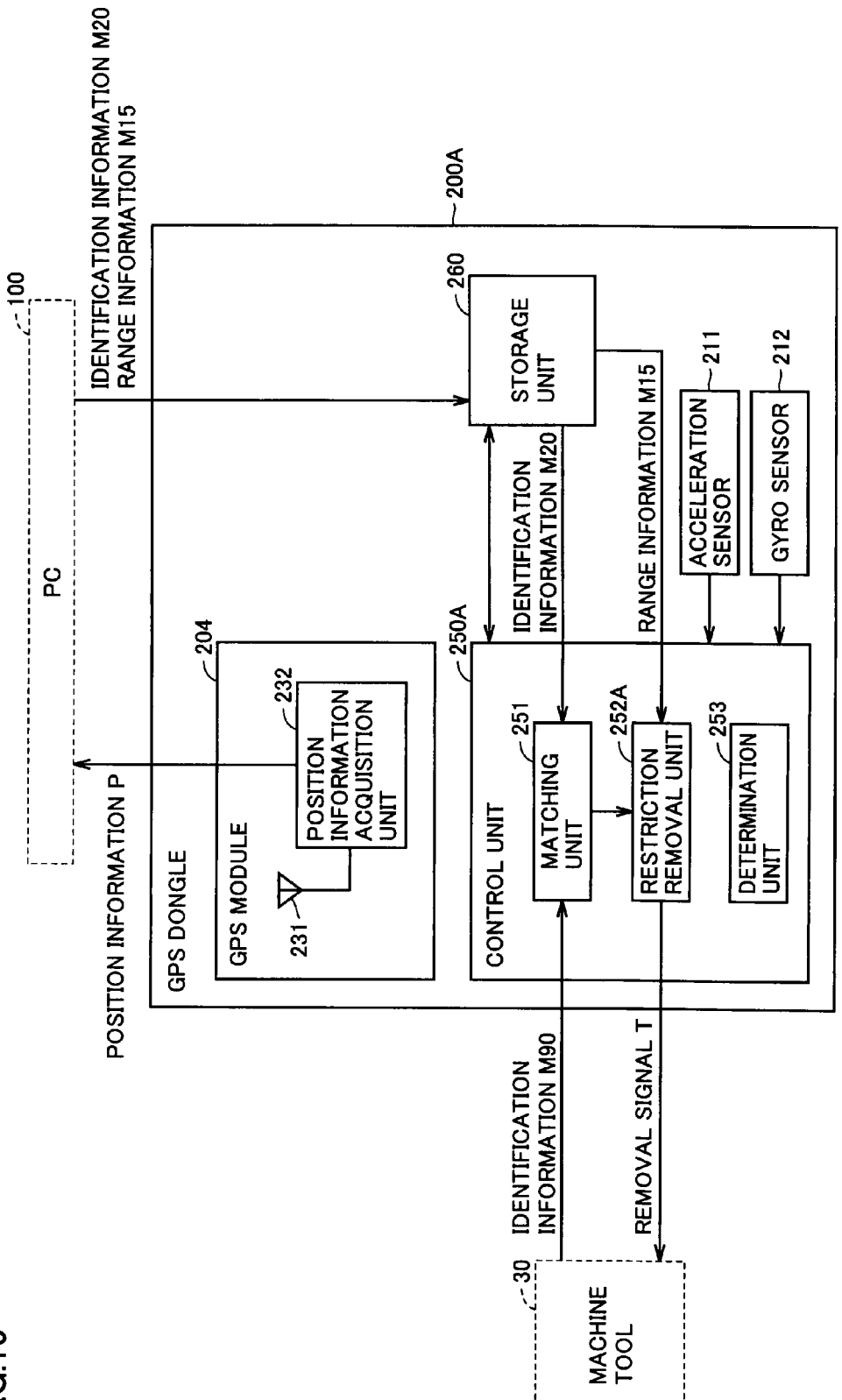
FIG. 15 is a block diagram illustrating a functional configuration of the GPS dongle.

FIG. 15 is a block diagram illustrating a functional configuration of GPS dongle 200A. Referring to FIG. 15, GPS dongle 200A includes GPS module 204, a control unit 250A, storage unit 260, acceleration sensor 211, and gyro sensor 212. Control unit 250A includes matching unit 251, a restriction removal unit 252A, and determination unit 253.

Restriction removal unit 252A acquires the current location position information with GPS module 204, and then detects a movement distance of GPS dongle 200A. When GPS dongle 200A is connected to machine tool 30, and if the current location of GPS dongle 200A calculated based on the detected movement distance is within a predetermined range, restriction removal unit 252A removes the activation restriction on machine tool 30. The "predetermined range" as used herein refers to the area indicated in range information M15 (see FIG. 14).

More specifically, restriction removal unit 252A performs the following processing. Restriction removal unit 252A identifies a direction in which the acceleration detected by acceleration sensor 211 was generated, based on output from gyro sensor 212.

Restriction removal unit 252A acquires the current location position information with GPS module 204, and then starts to calculate a movement distance of GPS dongle 200A. Here, restriction removal unit 252A performs second-order integration on detection results from the acceleration sensor in X, Y and Z directions, and obtains a value acquired by the second-order integration as the movement distance of GPS dongle 200A.

When GPS dongle 200A is connected to machine tool 30, restriction removal unit 252A adds information on the calculated movement distance to the acquired position information. Restriction removal unit 252A determines whether or not the total value (i.e., the actual position of machine tool 30) is a value included in the area indicated in range information M15. If it is determined that the total value is a value included in the area indicated in range information M15, restriction removal unit 252A removes the activation restriction on machine tool 30.

For enhanced accuracy, not only the movement distance but also a movement direction may be considered to determine whether or not the actual position of machine tool 30 is included in the area indicated in range information M15.

Conversion information for converting a movement distance to a latitude and a longitude is previously stored in storage unit 260, and is used by restriction removal unit 252A for the addition. The length of one second of longitude varies greatly with the latitude. For example, the length of one second of longitude is about 31 m on the equator, about 25 m at latitude 35 degrees, and 0 m at latitude 90 degrees. On the other hand, the length of one second of latitude is about 30.9 m on average regardless of the longitude. In the conversion information, therefore, relation between a movement distance and latitude/longitude is associated with latitude. For example, the latitude is divided into a plurality of sections, and the relation between a movement distance and latitude/longitude is associated with each section.

<Modification>

The activation restriction on machine tool 30 may be removed with the following method. That is, restriction removal unit 252A calculates a movement distance of GPS dongle 200A, and then if it is determined that the movement distance is within a predetermined distance, removes the activation restriction on machine tool 30. Instead of range information M15, movement distance information indicating the predetermined distance may be stored in machine installation information M1A (FIG. 14).

In this case, GPS dongle 200A may be configured without gyro sensor 212. That is, on the assumption that acceleration is always generated in the same direction, a value of second-order integration on a detection result may be obtained as the movement distance. This movement distance is a distance on the assumption of linear movement, and so usually has a greater value than when gyro sensor 212 is used. Accordingly, a criterion for determining whether or not machine tool 30 is included in the area indicated in range information M15 is higher than when gyro sensor 212 is used.

Third Embodiment

In the present embodiment, a configuration for removing the activation restriction based on weather information instead of the time and the movement distance as in the first and second embodiments is described.

FIG. 16 shows a general configuration of a GPS dongle 200B in electronic equipment 20 according to the present embodiment. Referring to FIG. 16, GPS dongle 200B includes, as main components, CPU 201 for executing a program, ROM 202 for storing data in a nonvolatile manner, RAM 203 for storing data in a volatile manner, GPS module 204, secondary battery 205, voltage reduction detection circuit 206, LED 207, timer 208, USB controller 209, USB terminal 210, a temperature sensor 213, a humidity sensor 214, and an atmospheric pressure sensor 215. The components except USB terminal 210 are connected to one another via a data bus.

Temperature sensor 213 detects a temperature outside of GPS dongle 200B (outside air temperature). Humidity sensor 214 detects a humidity outside of GPS dongle 200B. Atmospheric pressure sensor 215 detects an atmospheric pressure of outside air of GPS dongle 200B. The detection results from temperature sensor 213, humidity sensor 214 and atmospheric pressure sensor 215 are stored in RAM 203 while being associated with time information. A method of using the detection results will be described later. In the following description, temperature information, humidity information and atmospheric pressure information may be collectively referred to as "weather information."

The processing in GPS dongle 200B is implemented by the components of the hardware, and software executed by CPU 201. Such software is previously stored in ROM 202.

FIG. 17 shows machine installation information M1B in the machine installation information previously stored in server device 10. Referring to FIG. 17, machine installation information M1B includes installation information M10B and identification information M20. Installation information M10B includes planned installation position information M11 on machine tool 30, positional tolerance information M12, planned date information M13 on removal operation, and time information M16. Machine installation information M1B shown in FIG. 17 is different from machine installation information M1 shown in FIG. 7 in that time information M16 is included instead of operation timer information M14.

Time information M16 is information indicating time. Time information M16 is used to retrieve the weather information stored in RAM 203.

Figure 18:
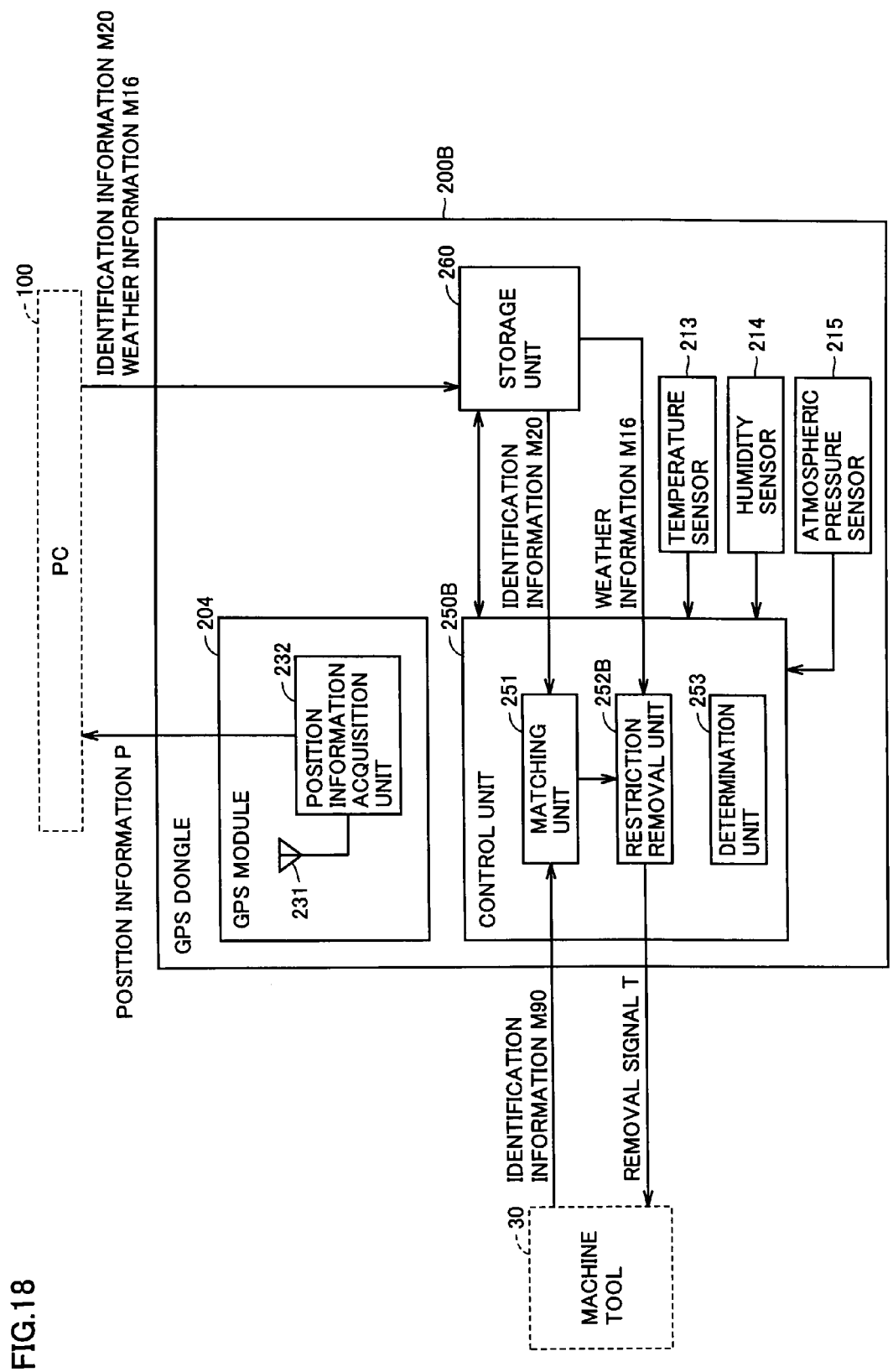
FIG. 18 is a block diagram illustrating a functional configuration of the GPS dongle.

FIG. 18 is a block diagram illustrating a functional configuration of GPS dongle 200B. Referring to FIG. 18, GPS dongle 200B includes GPS module 204, a control unit 250B, storage unit 260, temperature sensor 213, humidity sensor 214, and atmospheric pressure sensor 215. Control unit 250B includes matching unit 251, a restriction removal unit 252B, and determination unit 253.

Restriction removal unit 252B compares weather information at a point in time when GPS module 204 acquired the current location position information with weather information before a predetermined time prior to connection of GPS dongle 200B to machine tool 30. The weather information before a predetermined time as used herein refers to weather information stored in storage unit 260 at a point in time before the time indicated in time information M16 (see FIG. 17).

If the comparison shows that the difference between them is within a predetermined value, restriction removal unit 252B removes the activation restriction on machine tool 30. For example, if each of change in temperature, change in humidity, and change in atmospheric pressure is within each predetermined threshold value, restriction removal unit 252B removes the activation restriction on machine tool 30.

While the above configuration uses three pieces of information, namely, outside temperature, humidity and atmospheric pressure, this is not restrictive. The configuration may utilize at least one of temperature, humidity and atmospheric pressure.

<Other Configurations>

(1) The GPS dongle may be configured as described below. The GPS dongle is provided with a communication device capable of communication only within a predetermined distance. The GPS dongle is configured to remove the activation restriction on machine tool 30, if it is determined that the current location acquired with GPS module 204 is within the predetermined range having the planned installation position as a base point, and if communication with machine tool 30 has succeeded with the communication device within a predetermined time.

With such configuration, too, illegal removal of the activation restriction on machine tool 30 can be prevented.

(2) The method for removing the activation restriction on machine tool 30 based on time as described in the first embodiment and the method for removing the activation restriction based on a movement distance as described in the second embodiment may be combined.

(3) The movement distance may be limited by using an electronic device capable of communication only within a predetermined distance from a point where the current location position information was acquired.

(4) While GPS dongle 200 is applied to remove the restriction on machine tool 30 in the first to third embodiments, an applied object is not limited to machine tool 30. GPS dongle 200 may be used as a dongle key for restricting startup of equipment that needs to be limited in terms of installation position, and its software.

<Additional Comments>

In the embodiments according to the present invention, portable electronic equipment having a position detection function is provided, which can remove operation restriction on an object machine within a previously authorized installation range, only for a previously authorized machine, and for a previously authorized removal period. The portable electronic equipment includes information for identifying the object machine, information on the authorized installation range, and information on the period when the restriction can be removed, and has the function of removing the activation restriction on the object machine after determining that the object machine is within the authorized installation range, and then automatically checking whether or not it is within the authorized removal period and whether or not it is the authorized machine.

A GPS can be used, for example, as means for determining that the object machine is within the authorized installation range. As described above, however, a GPS cannot be used indoors. Thus, the position needs to be detected outdoors. In the present invention, a location of the portable electronic equipment is detected outdoors, and then a distance or a temporal distance between the location and the actual object machine is measured, thereby providing a mechanism for ensuring that the object machine is within the authorized installation range. For this reason, the portable electronic equipment includes the function of measuring a movement distance, e.g., the functions of an acceleration sensor and a gyro sensor. Instead of measuring the actual movement distance, temporal distance limitation may be imposed by putting short temporal limitation between when the position is acquired with the GPS and when the activation restriction removal operation is performed on the object machine, to attain the object.

Since it is necessary to determine that the portable electronic equipment and the object machine are be directly connected to each other, and that the location of the portable electronic equipment and the location of the object machine are the same location, it is determined that there is no device for extending a connection distance on the connection path, and encrypted communication is applied to prevent falsification of communication.

(1) An embodiment according to the present invention provides, instead of incorporating a GPS measurement device incapable of measurement indoors into an object machine required for activation restriction removal, electronic equipment which is brought outdoors separately from the object machine and capable of measuring a position of a building in which the object machine is installed with a GPS. This electronic equipment includes, for example, an acceleration sensor and a gyro sensor capable of measuring a movement distance after measuring the position with the GPS. After completion of the position measurement outdoors, a movement distance until the electronic equipment is connected to the object machine can be added to the position to calculate a location of the object machine required for activation restriction removal. The activation restriction removal function can be switched to be enabled or disabled depending on whether or not the location is within a predetermined authorized installation area, thereby preventing activation restriction removal in an unauthorized location. If matching of all pieces of authorization information has succeeded, the electronic equipment for activation restriction removal connected to the object machine transmits an encrypted code for activation restriction removal to the object machine, to remove the activation restriction.

(2) An embodiment according to the present invention provides electronic equipment for activation restriction removal, which does not use the acceleration sensor and the gyro sensor for measuring the movement distance, but ensures the position of the building with GPS measurement, and replaces a subsequent movement distance with a temporal distance to ensure that the installation location of an object machine required for activation restriction removal is within the authorized installation area, and includes a timer for limiting a period when the activation restriction removal function is enabled after measuring the position with the GPS in order to limit the temporal distance.

(3) An embodiment according to the present invention provides the detachable electronic equipment for activation restriction removal provided in (1) or (2) above, which previously records information unique to an object machine to automatically determine whether or not the object machine connected to the electronic equipment for activation restriction removal is the right machine upon connection, thereby preventing a human being performing activation restriction removal from intentionally performing activation restriction removal on another machine.

(4) An embodiment according to the present invention provides electronic equipment for activation restriction removal, which previously records a period when activation restriction removal operation can be performed by using a date and time acquired with the GPS measurement function, and matches the period when the operation can be performed with the current date and time, to make the restriction removal function enabled only during the period when the operation can be performed when the electronic equipment for activation restriction removal is connected to an object machine. This function can prevent a human being performing activation restriction removal from performing activation restriction removal which must not be performed based on past removal authorization information.

(5) An embodiment according to the present invention provides electronic equipment for activation restriction removal, which includes software for checking whether or not the electronic equipment for activation restriction removal is directly connected to an object machine.

The checking of direct connection is performed by counting the number of interposed hubs in the case of USB connection, for example. This function can prevent a human being performing activation restriction removal from performing activation restriction removal on an object machine beyond the authorized installation area by interposing the Internet or the like between the electronic equipment for activation restriction removal and the object machine.

(6) An embodiment according to the present invention provides electronic equipment for activation restriction removal, which includes software for conducting encrypted data communication with an object machine. The encrypted data communication can prevent interception of data communication between the electronic equipment for activation restriction removal and the object machine, and falsification of communication of the electronic equipment for activation restriction removal.

(7) An embodiment according to the present invention provides electronic equipment for activation restriction removal, which includes an interface capable of conducting encrypted communication with a data base server storing authorization information for activation restriction removal. The electronic equipment for activation restriction removal acquires information about removal authorization (an authorized installation area, an authorized removal period, information unique to a machine for removal, and the like) through communication with the data base server, and prevents a human being performing removal operation from directly seeing the contents of data, thereby avoiding data tampering by the worker. Since this communication function is mainly performed via the Internet, an external device such as a PC may be used as a substitute for a portion communicating with the Internet.

(8) An embodiment according to the present invention provides a procedure for ensuring that an object machine is within an authorized installation area, by measuring, based on position information at a location where the position information can be acquired near the object machine, a movement distance or a movement time from that position to the object machine, and performs activation restriction removal in accordance with this procedure, thereby preventing activation restriction removal on an object machine which is not in its proper location.

Although the present invention has been described and illustrated in detail, it is clearly understood that the same is by way of illustration and example only and is not to be taken by way of limitation, the scope of the present invention being interpreted by the terms of the appended claims.

What is claimed is:

1. Portable electronic equipment for removing activation restriction on a machine tool, the portable electronic equipment being portable with respect to the machine tool and comprising:
    a processor including:
    a first acquisition unit configured to acquire first information including a current location position of said portable electronic equipment;
    a second acquisition unit configured to acquire second information including a planned installation position of said machine tool, from a storage device which stores said second information;
    a first determination unit configured to determine whether or not the current location position is within a predetermined range from said planned installation position based on said first information and said second information; and
    a second determination unit configured to determine, if said first determination unit determines that the current location position is within the predetermined range from said planned installation position, whether or not a predetermined condition has been satisfied,
    wherein, said portable electronic equipment is configured to perform, if said second determination unit determines that said predetermined condition has been satisfied, information input processing on said machine tool to remove an activation restriction on said machine tool, and
    wherein said portable electronic equipment includes an interface to attach and detach from said machine tool.

2. The portable electronic equipment according to claim 1, wherein
    said second acquisition unit is configured to acquire said planned installation position from said storage device through encrypted communication, and
    said portable electronic equipment is configured to perform said information input processing on said machine tool through encrypted communication.

3. The portable electronic equipment according to claim 1, wherein
    said second determination unit is configured to determine that said predetermined condition has been satisfied when a time elapsed from acquiring the current location position by said first acquisition unit to attaching said portable electronic equipment to said machine tool is within a predetermined amount of time.

4. The portable electronic equipment according to claim 1, further comprising a movement distance detection unit configured to detect a movement distance of said portable electronic equipment based on output from a sensor after the current location position has been acquired by said first acquisition unit, wherein
    said second determination unit is configured to determine that said predetermined condition has been satisfied if the current location position of said portable electronic equipment calculated based on the movement distance detected by said movement distance detection unit is within the predetermined range when said portable electronic equipment is connected to said machine tool.

5. The portable electronic equipment according to claim 1, further comprising a communication device configured to communicate only within a predetermined distance, wherein
    said second determination unit is configured to determine that said predetermined condition has been satisfied if communication with said machine tool has succeeded using said communication device within a predetermined time after the current location position has been acquired by said first acquisition unit.

6. The portable electronic equipment according to claim 1, further comprising a weather information acquisition unit configured to acquire weather information including at least one of temperature, humidity, and atmospheric pressure, wherein
    said second determination unit is configured to determine that said predetermined condition has been satisfied if a difference between outside weather information acquired by said weather information acquisition unit, when the current location position is acquired by said first acquisition unit, and said weather information acquired by said weather information acquisition unit before a predetermined time prior to connection of said portable electronic equipment to said machine tool, is within a predetermined value.

7. A restriction removal method for removing activation restriction on a machine tool using portable electronic equipment, the portable electronic equipment being portable with respect to the machine tool, the method comprising:
    acquiring, using a processor in said portable electronic equipment, first information including a current location position of said portable electronic equipment;

acquiring, using said processor, second information including a planned installation position of said machine tool, from a storage device which stores said second information;

determining, using said processor, whether or not the current location position is within a predetermined range from said planned installation position based on said first information and said second information;

determining, using said processor, if it is determined that the current location position is within the predetermined range from said planned installation position, whether or not a predetermined condition has been satisfied; and performing, using said processor, if it is determined that said predetermined condition has been satisfied, information input processing on said machine tool, to remove activation restriction on said machine tool, wherein said portable electronic equipment includes an interface to attach and detach from said machine tool.

8. The portable electronic equipment according to claim 1, wherein
said storage device is located on a server device, and
the server device is separate from and located external to said portable electronic equipment.

9. The portable electronic equipment according to claim 1, wherein said machine tool includes:
a sensing device configured to sense vibrations of said machine tool, and
an activation restriction device configured to restrict activation of said machine tool.

10. The portable electronic equipment according to claim 9, wherein, when the sensing device senses vibrations of said machine tool, said activation restriction device restricts activation of said machine tool.

11. The restriction removal method according to claim 7, wherein
said storage device is located on a server device, and
the server device is separate from and located external to said portable electronic equipment.

12. The restriction removal method according to claim 7, further comprising:
sensing vibrations of said machine tool, and
restricting activation of said machine tool when said sensing vibrations of said machine tool.

13. The portable electronic equipment according to claim 1, wherein, when said first acquisition unit acquires said current location position, said portable electronic equipment is not in physical connection with said machine tool.

14. The portable electronic equipment according to claim 1, wherein
said second acquisition unit is configured to receive first identification information of said machine tool from the storage device, of a server device, and second identification information of said machine tool from said machine tool, and
said second determination unit is configured to determine that said predetermined condition has been satisfied if said first identification information of said machine tool matches said second identification information of said machine tool.

15. The portable electronic equipment according to claim 14, wherein, when said second acquisition unit receives said first identification information, said portable electronic equipment is not in physical connection with said machine tool.

16. The portable electronic equipment according to claim 14, wherein, when said second acquisition unit receives said second identification information, said portable electronic equipment is in physical connection with said machine tool.

17. The portable electronic equipment according to claim 16, wherein said second acquisition unit is configured to receive said second identification information of said machine tool when said portable electronic equipment is physically connected to said machine tool by a user.

* * * * *